(12) United States Patent
Ogata

(10) Patent No.: US 11,245,322 B2
(45) Date of Patent: Feb. 8, 2022

(54) SLIDE ACTUATOR

(71) Applicant: OLYMPUS CORPORATION, Tokyo (JP)

(72) Inventor: Ken Ogata, Chofu (JP)

(73) Assignee: OLYMPUS CORPORATION, Tokyo (JP)

( * ) Notice: Subject to any disclaimer, the term of this patent is extended or adjusted under 35 U.S.C. 154(b) by 1 day.

(21) Appl. No.: 17/038,300

(22) Filed: Sep. 30, 2020

(65) Prior Publication Data

US 2021/0013790 A1 Jan. 14, 2021

Related U.S. Application Data

(63) Continuation of application No. PCT/JP2018/014785, filed on Apr. 6, 2018.

(51) Int. Cl.
*H02K 41/035* (2006.01)

(52) U.S. Cl.
CPC ................. *H02K 41/0356* (2013.01)

(58) Field of Classification Search
CPC ........... H02K 41/03; H02K 7/06; H02K 37/14
USPC ..................... 310/12.01, 12.04, 12.12, 12.16
See application file for complete search history.

(56) References Cited

U.S. PATENT DOCUMENTS

| 4,262,974 | A | 4/1981 | Tojo et al. |
| 5,180,230 | A | 1/1993 | McCarthy et al. |
| 8,283,834 | B2 * | 10/2012 | Matsubara ............... H02N 1/08 310/309 |
| 2005/0212365 | A1 * | 9/2005 | Kraus ................... B26B 19/288 310/36 |
| 2010/0301783 | A1 * | 12/2010 | Luckel ................. H02P 25/032 318/127 |

FOREIGN PATENT DOCUMENTS

| DE | 40 28 383 A1 | 3/1991 |
| JP | 55-51119 A | 4/1980 |
| JP | 55-60718 A | 5/1980 |
| JP | 01-156311 U | 10/1989 |

(Continued)

OTHER PUBLICATIONS

International Search Report dated May 29, 2018 received in PCT/JP2018/014785.

*Primary Examiner* — Jose A Gonzalez Quinones

(74) *Attorney, Agent, or Firm* — Scully, Scott, Murphy & Presser, P.C.

(57) ABSTRACT

A slide actuator according to the present invention includes: a fixed member; a movable member movable in a predetermined direction with respect to the fixed member; a wall portion of the fixed member disposed in a moving direction of the movable member; a plurality of balls interposed between the fixed member and the movable member and configured to movably support the movable member; a retainer configured to maintain a constant distance between the respective balls; a retainer spring connected between the wall portion and the retainer; and a movable portion spring connected between the movable member and the wall portion, in which the retainer spring is disposed so as to suppress a displacement of the retainer in the moving direction, and the movable portion spring is disposed so as to suppress a displacement of the movable member in the moving direction.

11 Claims, 7 Drawing Sheets

(56) References Cited

FOREIGN PATENT DOCUMENTS

| JP | 05-217874 A | 8/1993 |
| JP | 2006-046444 A | 2/2006 |
| JP | 2008-057679 A | 3/2008 |

\* cited by examiner

SLIDE ACTUATOR

CROSS REFERENCE TO RELATED APPLICATION

This application is a continuation application of PCT/JP2018/014785 filed on Apr. 6, 2018, the entire contents of which are incorporated herein by this reference.

BACKGROUND OF THE INVENTION

1. Field of the Invention

The present invention relates to a slide actuator where a movable portion is made to be movably supported with respect to a fixed portion by way of a retainer which maintains a constant distance between a ball and a ball.

2. Description of the Related Art

Conventionally, there has been known a slide actuator where an object to be moved is held on a movable portion which is slidably disposed with respect to a fixed portion, and the object to be moved is made to perform reciprocating linear movement in a state where the object to be moved maintains a posture orthogonal to a moving direction of the object to be moved. Such a slide actuator is adopted by a well-known voice coil motor (VCM) or the like.

As shown in FIG. 8A to FIG. 8C, a slide actuator 101 of this type includes: a fixed portion 102 fixed to an apparatus body; a movable portion 103 which faces the fixed portion 102; and a linear guide 104 which is interposed between the fixed portion 102 and the movable portion 103 and supports the movable portion 103 such that the movable portion 103 is linearly movable along the fixed portion 102. Further, the linear guide 104 includes: a plurality of balls 105 which allow a linear movement of the movable portion 103; and a retainer 106 which rotatably holds the respective balls 105 at a constant distance.

A stroke range Ls of the movable portion 103 is set by a movable portion instruction value (current) having a sinusoidal wave shown in FIG. 4A, and the movable portion instruction current is supplied to the slide actuator. As a result, the reciprocating linear movement is repeated where the movable portion 103, from a state where the movable portion 103 is positioned at a center of the stroke range Ls shown in FIG. 8A, slides in a plus (+) direction as shown in FIG. 8B, returns to a minus (−) direction at an end portion of the stroke range Ls, and further returns in the plus direction at an end portion of the stroke range Ls as shown in FIG. 8C, for example.

During a period in which the movable portion 103 of the slide actuator 101 repeats the reciprocating linear movement, there is a case where the slide actuator 101 receives strong disturbance such as an impact or vibrations, and as shown in FIG. 9A, either the movable portion 103 or the retainer 106 is pushed toward one side by a biasing force F generated by the disturbance so that the positional relationship between the movable portion 103 and the retainer 106 is displaced.

When the movable portion 103 returns in the minus direction as shown in FIG. 9B in a state where a displacement occurs between the movable portion 103 and the retainer 106, an end portion of the retainer 106 is brought into contact with a wall portion 102a of the fixed portion 102 before the movable portion 103 reaches the end portion of the stroke range Ls so that the movement of the retainer 106 is stopped.

For example, Japanese Patent Application Laid-Open Publication No. 2008-57679 discloses a technique where, when the displacement in a slide direction occurs between a movable portion (slide table) and a retainer (cage), first, the retainer of a linear guide is brought into contact with a movable end of the retainer of a linear guide by pushing and, then, the movable portion is forcibly made to slide so that displacement is corrected.

When the movable portion 103 is forcibly made to slide from a state shown in FIG. 9B so as to correct the displacement between the retainer 106 and the movable portion 103 as shown in FIG. 9C, a sliding friction occurs between the movable portion 103 and balls 105 during a period in which the movable portion 103 slides.

In the technique disclosed in Japanese Patent Application Laid-Open Publication No. 2008-57679, as shown in FIG. 9A, once a control deviation ΔLs is generated between the movable portion 103 and the retainer 106, as shown in FIG. 9D, at least one reciprocating movement becomes necessary until a normal positional relationship is restored.

SUMMARY OF THE INVENTION

According to an aspect of the present invention, a slide actuator includes: a fixed member; a movable member movable in a predetermined direction with respect to the fixed member; a wall portion of the fixed member disposed in a moving direction of the movable member; a plurality of balls interposed between the fixed member and the movable member and configured to movably support the movable member; a retainer interposed between the respective balls and configured to maintain a constant distance between the respective balls; a first structural body having spring property and connected between the wall portion and the retainer; and a second structural body having spring property and connected between the wall portion and the movable member, wherein the first structural body is disposed so as to suppress a displacement of the retainer in the moving direction, and the second structural body is disposed so as to suppress a displacement of the movable member in the moving direction.

DETAILED DESCRIPTION OF THE PREFERRED EMBODIMENTS

Figure 1:
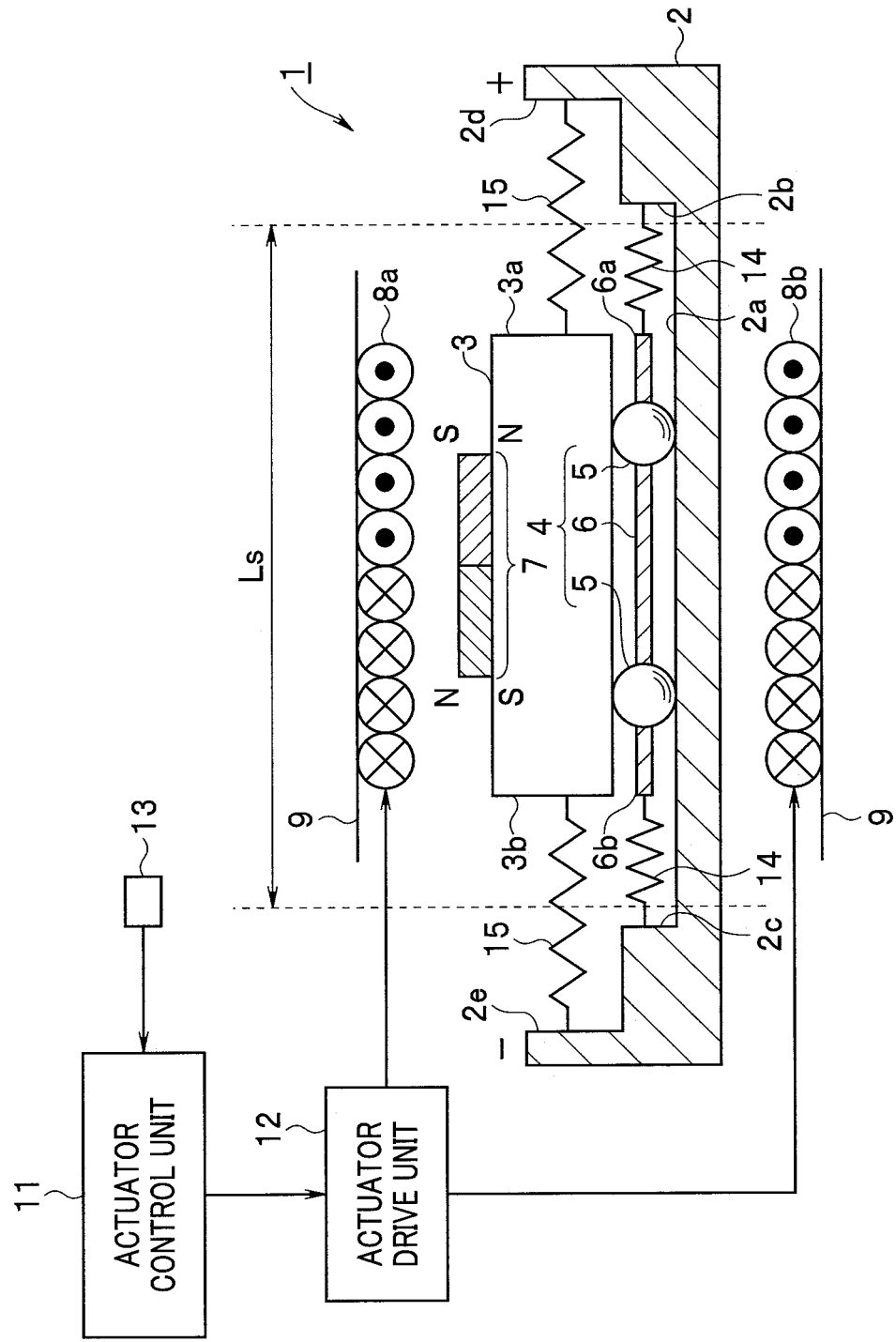
FIG. 1 is a schematic side view of a slide actuator according to a first embodiment.

Hereinafter, embodiments of the present invention will be described with reference to drawings. Note that the drawings are schematic views. Accordingly, it must be noted that a relationship between a thickness and a width of each member, a ratio between thicknesses of respective members and the like differ from the corresponding relationships of members of an actual slide actuator. Needless to say, portions of the slide actuator are described with different size relationship or different ratios also between the drawings.

First Embodiment

FIG. 1 to FIG. 4B show a first embodiment of the present invention. In the drawings, symbol 1 indicates a slide actuator of an electromagnetic type represented by a voice coil motor. The slide actuator 1 includes: a fixed portion 2 as a fixed member fixed to an apparatus body not shown; a movable portion 3 as a movable member which is slidable on the fixed portion 2; and a linear guide 4 which is interposed between the fixed portion 2 and the movable portion 3. The linear guide 4 is formed of: a plurality of balls 5 which allow a linear movement of the movable portion 3 along a stage 2a of the fixed portion 2; and a retainer 6 which rotatably supports the respective balls 5 at a predetermined interval. Note that although not shown, a trajectory groove which guides the movement of the balls 5 linearly is formed on the stage 2a, and the balls 5 are disposed in the trajectory groove.

The movable portion 3 holds, for example, an optical element as an object to be moved, and a permanent magnet 7 is fixed to an upper surface of the movable portion 3. A pair of flat coils 8a, 8b is disposed in a state where the flat coils 8a, 8b face the permanent magnet 7. In other words, the permanent magnet 7 is arranged so as to apply a proper magnetic field to the flat coils 8a, 8b. The respective flat coils 8a, 8b are mounted on a coil support portion 9 which is fixed to the apparatus body not shown. Note that although the slide actuator 1 according to the embodiment is of a movable magnet type, the slide actuator 1 may be of a movable coil type where flat coils are mounted on the movable portion 3, and a permanent magnet is made to face the flat coils.

An output side of an actuator control unit 11 is connected to the respective flat coils 8a, 8b via an actuator drive unit 12. A position detection sensor 13 for detecting a movement position of the movable portion 3 is connected to an input side of the actuator control unit 11.

The actuator control unit 11 is mainly formed of a well-known microcomputer which includes a CPU, a ROM, a RAM and an interface which are well-known. The actuator control unit 11 obtains a control deviation ΔLs shown in FIG. 4B by comparing position information of the movable portion 3 which the position detection sensor 13 detects and a movable portion instruction position shown in FIG. 4A, and outputs a control signal which corrects the control deviation ΔLs to the actuator drive unit 12.

As a result, the actuator drive unit 12 outputs a drive current corresponding to the control signal to the flat coils 8a, 8b, and a Lorentz force is generated by a magnetic field of the permanent magnet 7 whereby the movable portion 3 slides. A moving direction of the movable portion 3 is decided based on a direction of a current supplied to the flat coils 8a, 8b, and a magnitude of a force is changed depending on an amount of the current. Note that the configuration of the permanent magnet 7, the flat coils 8a, 8b, the coil support portion 9, the actuator control unit 11, the actuator drive unit 12, a drive system of the position detection sensor 13 and a control system are described in FIG. 1 in a representing manner, and such configurations are omitted in FIG. 2A to FIG. 3D and a second embodiment and embodiments succeeding the second embodiment described later.

Figure 4A:
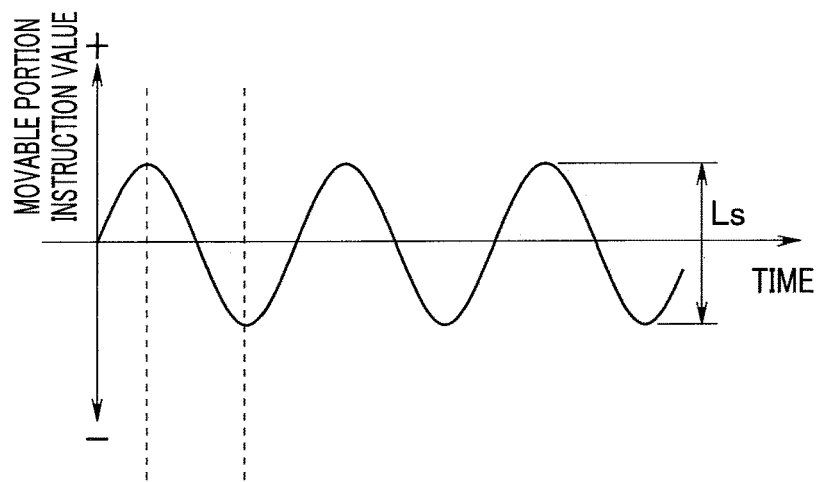
FIG. 4A is a waveform diagram showing a movable portion instruction value of a sinusoidal wave for making the movable portion operate according to the first embodiment.

When the actuator drive unit 12 supplies a movable portion instruction value (drive current) of a sinusoidal wave as shown in FIG. 4A to the flat coils 8a, 8b in response to a PWM signal outputted from the actuator control unit 11, for example, the movable portion 3 repeats a reciprocating linear movement within a stroke range Ls. In this case, assuming no slippage occurs between the movable portion 3 and the balls 5 and between the balls 5 and the trajectory groove, a moving amount of the retainer 6 becomes ½ of a moving amount of the movable portion 3 because of rotation of the balls 5. Note that hereinafter, for the sake of convenience, the moving direction of the movable portion 3 and the linear guide 4 is described by setting a right side in the drawing as a plus (+) direction and a left side in the drawing as a minus (−) direction.

Between end portions 6a, 6b of the retainer 6 in the moving direction and lower wall portions 2b, 2c of the fixed portion 2 which face the end portions 6a, 6b, mechanical retainer springs 14 which form first structural bodies each having spring property are respectively connected. Further, between end portions 3a, 3b of the movable portion 3 in the moving direction and upper wall portions 2d, 2e of the fixed portion 2 which face the end portions 3a, 3b, mechanical movable portion springs 15 which form second structural bodies each having spring property are respectively connected. A spring constant of the retainer spring 14 is set to ½ of a spring constant of the movable portion spring 15.

The respective springs 14, 15 may be formed of either a compression spring or a tensile spring. When the springs 14, 15 are each formed of a compression spring, a free height of the retainer spring 14 is set longer than a maximum distance between the end portions 6a, 6b of the retainer 6 and the lower wall portions 2b, 2c, and a solid height of the retainer spring 14 is set shorter than a minimum distance between the end portions 6a, 6b and the lower wall portions 2b, 2c. A free height of the movable portion spring 15 is set longer than a maximum distance between the end portions 3a, 3b of the movable portion 3 and the upper wall portions 2d, 2e, and a solid height of the movable portion spring 15 is set shorter than a minimum distance between the end portions 3a, 3b and the upper wall portions 2d, 2e.

When the springs 14, 15 are each formed of a tensile spring, a free length of the retainer spring 14 is set shorter than a minimum distance between the end portions 6a, 6b of the retainer 6 and the lower wall portions 2b, 2c, and a length obtained by adding a required deflection amount to the free length is set longer than the maximum distance between the end portions 6a, 6b and the lower wall portions 2b, 2c. A free length of the movable portion spring 15 is set shorter than a minimum distance between the end portions 3a, 3b of the movable portion 3 and the upper wall portions 2d, 2e, and a length obtained by adding a required deflection amount to the free length is set longer than the maximum distance between the end portions 3a, 3b and the upper wall portions 2d, 2e. Note that symbol G indicates grease pools formed at ridge portions between the lower wall portions 2b, 2c and the stage 2a.

Next, a manner of operation of the embodiment having such a configuration will be described. In a state where a current is not supplied to the flat coils 8a, 8b, both retainer springs 14 and both movable portion springs 15 are each maintained in a balanced state. Accordingly, as shown in FIG. 1, the movable portion 3 and the linear guide 4 are stopped at a neutral position.

In such a state, when the actuator drive unit 12 supplies the movable portion instruction value (drive current) of the sinusoidal wave as shown in FIG. 4A to the flat coils 8a, 8b in response to the PWM signal from the actuator control unit 11, the movable portion 3 performs reciprocating linear movement within the stroke range Ls.

Figure 2A:
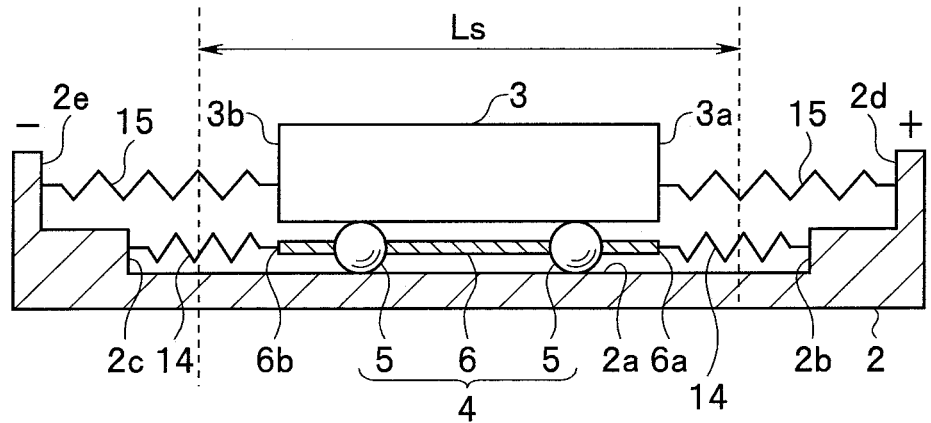
FIG. 2A is a schematic side view of the slide actuator according to the first embodiment showing a state where a movable portion is at an initial position.
Figure 2B:
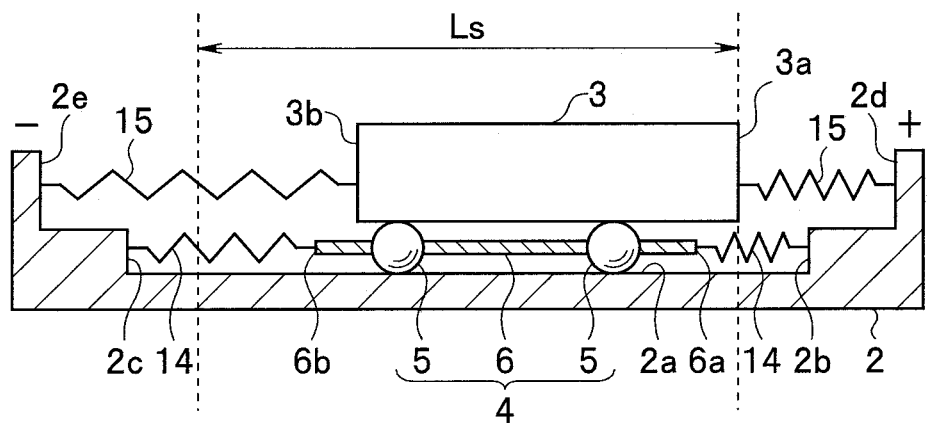
FIG. 2B is a schematic side view of the slide actuator according to the first embodiment showing a state where the movable portion reaches a movable end of a forward path.
Figure 2C:
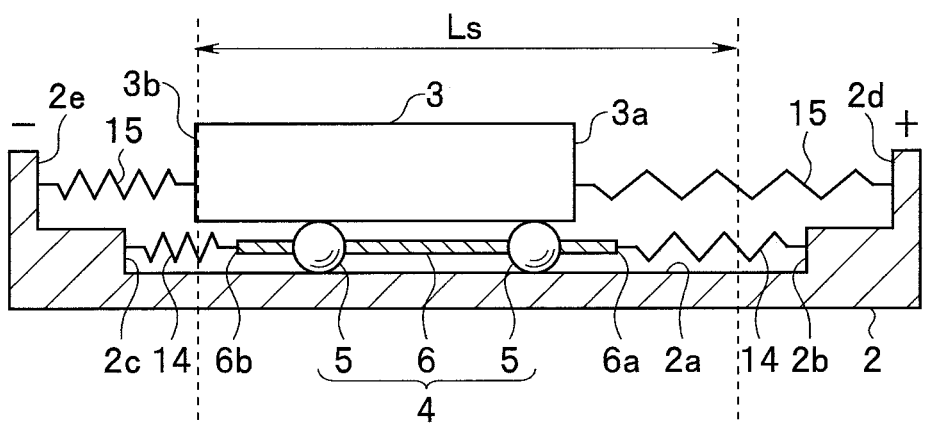
FIG. 2C is a schematic side view of the slide actuator according to the first embodiment showing a state where the movable portion reaches a movable end of a backward path.

In such an operation, the retainer springs 14 which are connected between both end portions 6a, 6b of the retainer 6 and the lower wall portions 2b, 2c and the movable portion springs 15 which are connected between both end portions 3a, 3b of the movable portion 3 and the upper wall portions 2d, 2e are contracted on a side where the end portion and the wall portion approach close to each other and are stretched on a side where the end portion and the wall portion are spaced apart from each other, as shown in FIG. 2B and FIG. 2C.

When the movable portion 3 performs reciprocating linear movement, a moving amount of the retainer 6 becomes ½ of a moving amount of the movable portion 3 because of the rotation of the balls 5. A spring constant of the retainer spring 14 is set to ½ of a spring constant of the movable portion spring 15 in conformity with a moving amount of the retainer 6 with respect to the movable portion 3. Accordingly, even when the retainer springs 14 and the movable portion springs 15 are contracted or stretched corresponding to the movement of the retainer 6 and the movement of the movable portion 3, there is no possibility that the displacement occurs in positional relationship between the movable portion 3 and the retainer 6.

As described previously, as shown in FIG. 2A, at the neutral position, both retainer springs 14 and both movable portion springs 15 assume positions where the respective springs are maintained in a balanced state. Accordingly, even when the slight displacement occurs in the positional relationship between the movable portion 3 and the retainer 6, it is possible to correct the displacement when the movable portion 3 passes the neutral position.

Figure 3A:
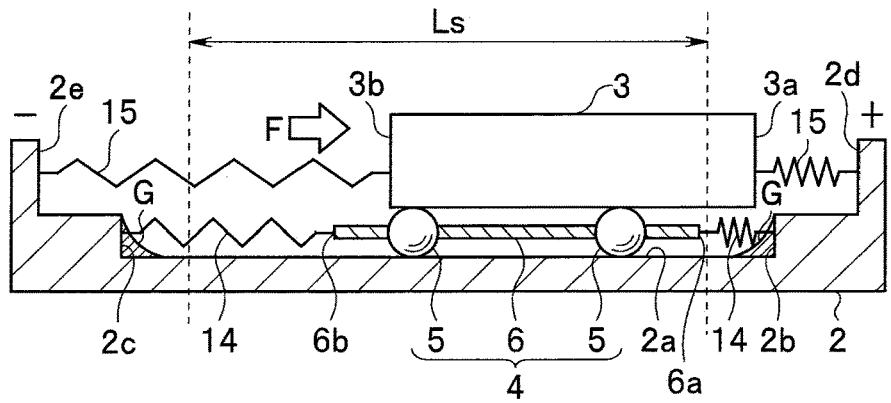
FIG. 3A is a schematic side view of the slide actuator according to the first embodiment showing a state where the movable portion is strongly pushed toward one side by a biasing force.

As shown in FIG. 3A, assume a case where the slide actuator 1 receives strong disturbance such as an impact or vibrations, and the movable portion 3 is strongly pushed so as to tend to be largely displaced in the plus (+) direction, for example, due to a biasing force F generated by the disturbance. In this case, an impact applied to the movable portion 3 is attenuated by a buffer action generated by deflection of the movable portion spring 15 and hence, the displacement is suppressed. As a result, as indicated by a solid line in FIG. 4B, control deviation ΔLs is largely attenuated compared to conventional control deviation ΔLs indicated by a broken line. Further, the positional displacement between the movable portion 3 and the retainer 6 becomes minimum and hence, sliding friction between the movable portion 3 and the balls 5 can be largely reduced, whereby lowering of wear resistance and durability can be suppressed.

Figure 3B:
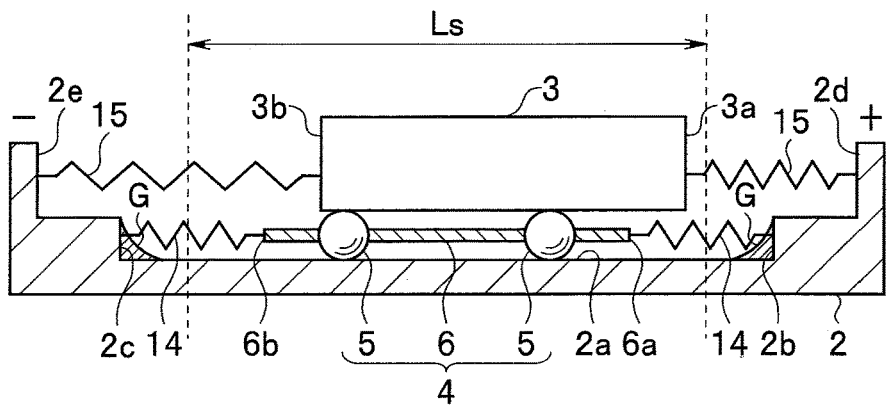
FIG. 3B is a schematic side view of the slide actuator according to the first embodiment showing a state where the movable portion is on a way of moving in a backward path direction from the state shown in FIG. 3A.
Figure 3C:
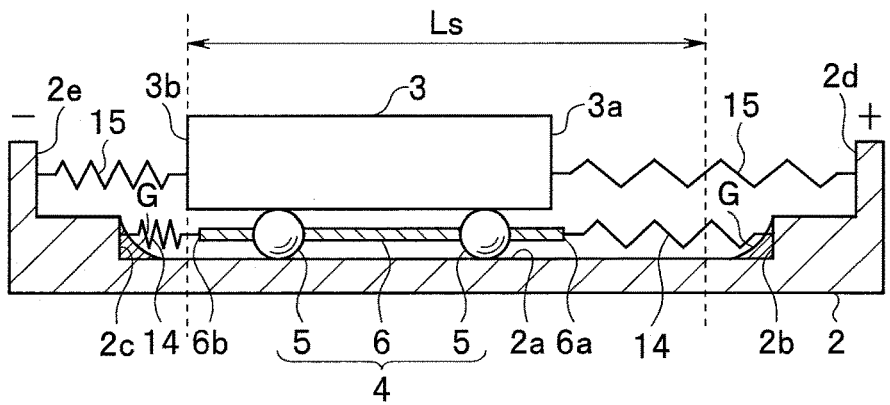
FIG. 3C is a schematic side view of the slide actuator according to the first embodiment showing a state where the movable portion reaches a movable end of the backward path.
Figure 3D:
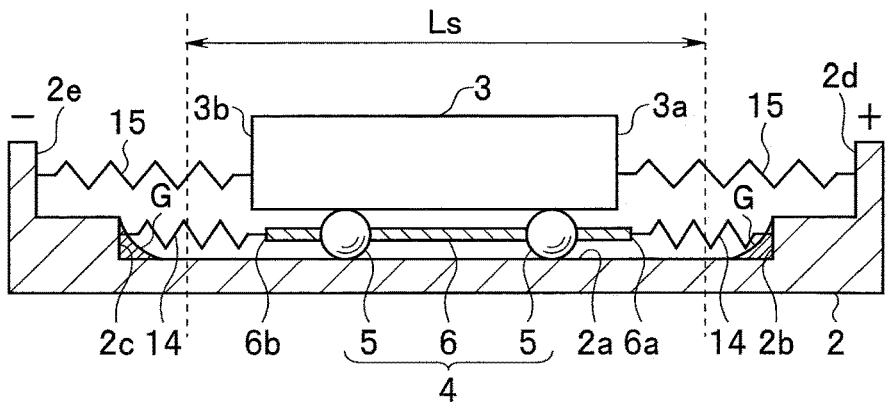
FIG. 3D is a schematic side view of the slide actuator according to the first embodiment showing a state where the movable portion passes the initial position.
Figure 4B:
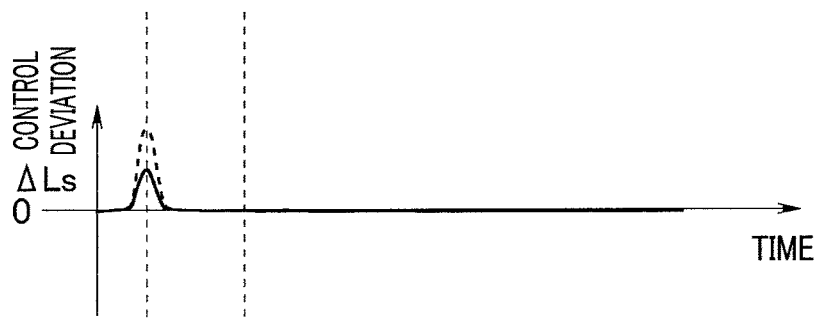
FIG. 4B is a waveform diagram showing a control deviation between a movable portion instruction value and an actual position of the movable portion according to the first embodiment.

The control deviation ΔLs is largely attenuated in a forward path and hence, in a backward path shown in FIG. 3B and FIG. 3C, in cooperation with a spring balance obtained by respective springs 14, 15, when the end portion 3b of the movable portion 3 reaches an end portion of the stroke range Ls in the minus (−) direction, as shown in FIG. 4B, the control deviation ΔLs is corrected at an early stage. As a result, it is possible to acquire high control accuracy compared to the conventional control deviation ΔLs which is indicated by the broken line in the same drawing and occurs twice.

As shown in FIG. 3B, even when the end portion 6b of the retainer 6 projects from the end portion 3b of the movable portion 3 in the forward path, a projection amount is corrected by a spring balance and hence, there is no possibility that the end portion 3b is immersed in the grease pool G formed at the ridge portion between the lower wall portion 2c and the stage 2a. As a result, the retainer 6 can be made to take the backward path and the forward path without being affected by viscosity resistance of the grease pool G and hence, it is possible to acquire high position control accuracy. Note that the above-mentioned advantageous effects can be substantially acquired also in a case where the retainer 6 or both the movable portion 3 and the retainer 6 are pushed by a strong biasing force F.

Second Embodiment

Figure 5:
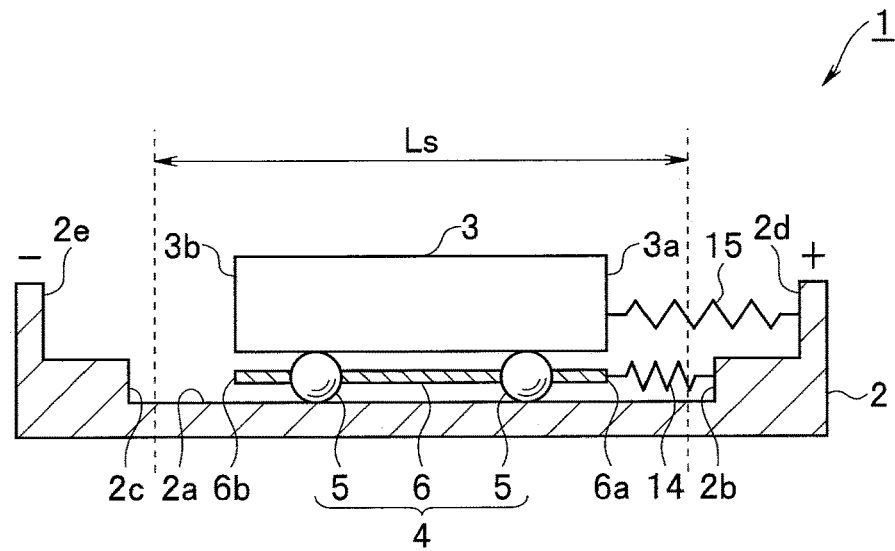
FIG. 5 is a schematic side view of a slide actuator according to a second embodiment.

FIG. 5 shows a second embodiment according to the present invention. Note that components substantially equivalent to the corresponding components in the first embodiment are given the same symbols and the description of such components is omitted or simplified.

In the above-mentioned first embodiment, the retainer springs 14 and the movable portion springs 15 are respectively connected between both end portions 6a, 6b of the retainer 6 and the lower wall portions 2b, 2c and between both end portions 3a, 3b of the movable portion 3 and the upper wall portions 2d, 2e. In the second embodiment, the retainer spring 14 and the movable portion spring 15 are connected only to one end portion of the retainer 6 and one end portion of the movable portion 3 on the same side.

In other words, in the drawing, the retainer spring 14 is connected only between an end portion 6a of a retainer 6 and a lower wall portion 2b, and the movable portion spring 15 is connected only between an end portion 3a of a movable portion 3 and an upper wall portion 2d.

The drawing shows an initial position of a linear guide 4 and the movable portion 3 where flat coils 8a, 8b (see FIG. 1) are in a non-current supplied state and both springs 14, 15 are in a free state. In the embodiment, a tensile and compression dual-use spring is adopted as both springs 14, 15.

In other words, both the springs 14, 15 function as compression springs when the movable portion 3 and the linear guide 4 tend to move in a plus (+) direction in the drawing, and function as tensile springs when the movable portion 3 and the linear guide 4 tend to move in a minus (−) direction. A spring constant of the retainer spring 14 is set to ½ of a spring constant of the movable portion spring 15.

In this case, spring constants of the respective springs 14, 15 in the second embodiment are set twice as large as spring constants of the respective springs 14, 15 in the first embodiment where the respective springs 14, 15 are disposed on both sides of the retainer 6 and the movable portion 3. In other words, when the spring constant of the retainer spring 14 in the second embodiment is ½ of the spring constant of the movable portion spring 15 in the second embodiment, the spring constant of the movable portion spring 15 in the first embodiment becomes ½ of the spring constant of the movable portion spring 15 in the second embodiment, and the spring constant of the retainer spring 14 in the first embodiment becomes ¼ of the spring constant of the movable portion spring 15 in the second embodiment.

With such a configuration, when the movable portion 3 and the linear guide 4 perform the reciprocating linear movement, even when at least one of the movable portion 3 and the linear guide 4 is pushed by a strong biasing force F, an impact is buffered and displacement is suppressed by deflections (compressive deformations or tensile deformations) between the movable portion spring 15 and the retainer spring 14. Accordingly, there is no possibility that the positional relationship between the movable portion 3 and the retainer 6 is largely displaced.

As a result, in the same manner as in the first embodiment, sliding friction between the movable portion 3 and the balls 5 is reduced and hence, lowering of wear resistance and durability is suppressed. Further, it is possible to acquire high position control accuracy. Further, the springs 14, 15 are disposed only on one side of the retainer 6 and the movable portion 3 and hence, the number of parts can be reduced whereby downsizing and the reduction of weight of the apparatus can be realized.

Third Embodiment

Figure 6:
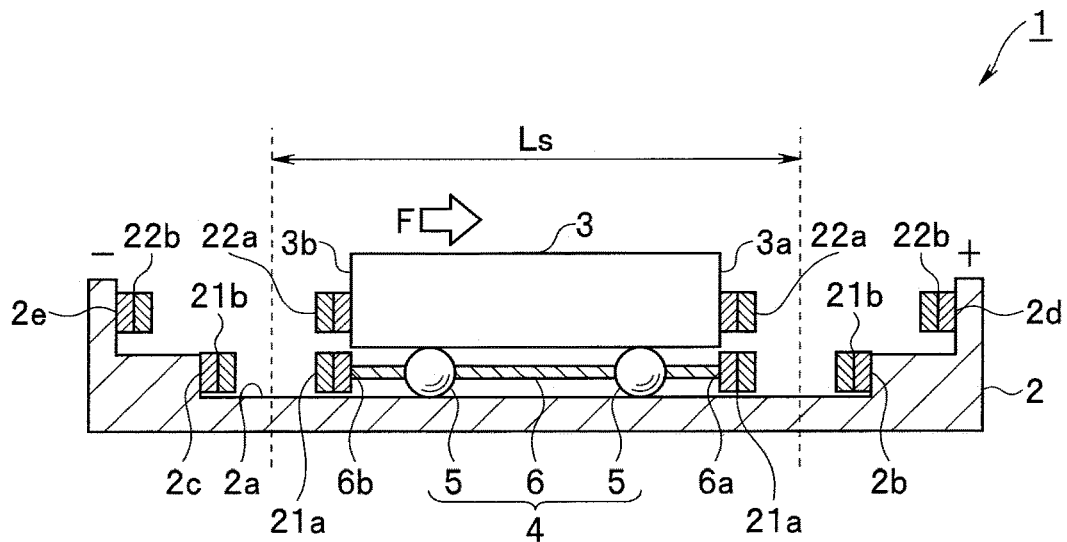
FIG. 6 is a schematic side view of a slide actuator according to a third embodiment.

FIG. 6 shows a third embodiment of the present invention. In the embodiment, first and second structural bodies having spring property are each formed of a magnetic spring. Note that components similar to the corresponding components in the first embodiment are given the same symbols and the description of such components is omitted or simplified.

In other words, retainer magnets 21a, 21b which are permanent magnets are disposed on both end portions 6a, 6b of a retainer 6 and lower wall portions 2b, 2c of a fixed portion 2 which face the end portions 6a, 6b in a state where the same magnetic poles face each other. In the same manner, movable portion magnets 22a, 22b which are permanent magnets are disposed on end portions 3a, 3b of a movable portion 3 and upper wall portions 2d, 2e which face the end portions 3a, 3b in a state where the same magnetic poles face each other.

As a result, magnetic forces in directions that the magnets repel each other (repelling magnetic forces) act as a magnetic spring between the retainer magnets 21a and 21b which face each other and between the movable portion magnets 22a and 22b which face each other. The repelling magnetic forces between the retainer magnets 21a and 21b are set to ½ of the repelling magnetic forces between the movable portion magnets 22a and 22b. Note that assume that the movable portion 3 and a linear guide 4 perform reciprocating linear movement between the movable portion magnets 22a and 22b and between the retainer magnets 21a and 21b within a range where the repelling magnetic forces act respectively. Accordingly, an initial position is disposed at a center where a magnetic balance is maintained as shown in FIG. 6.

With such a configuration, when at least one of the movable portion 3 which repeatedly performs the reciprocating linear movement and the linear guide 4 which is operated following the reciprocating linear movement of the movable portion 3 is pushed, for example, in a plus (+) direction by a strong biasing force F, the biasing force F is attenuated by the repelling magnetic force between the retainer magnets 21a and 21b and the repelling magnetic force between the movable portion magnets 22a and 22b on a plus (+) side and hence, the displacement is suppressed.

Accordingly, there is no possibility that the positional relationship between the movable portion 3 and the retainer 6 is largely displaced. Accordingly, sliding friction between the movable portion 3 and balls 5 can be reduced and hence, lowering of wear resistance and durability can be suppressed and, further, it is possible to acquire high position control accuracy.

It is also possible that, by arranging the retainer magnets 21a and 21b which face each other and the movable portion magnets 22a and 22b which face each other such that the opposite magnetic poles face each other, magnetic forces in directions that the magnets attract each other (attracting magnetic forces) act as magnetic springs. In this case, assume that at least one of the movable portion 3 and the linear guide 4 is pushed, for example, in the plus (+) direction by a strong biasing force F, the biasing force F is attenuated by the attracting magnetic forces between the retainer magnets 21a and 21b and the attracting magnetic forces between the movable portion magnets 22a and 22b on a minus (−) side.

Fourth Embodiment

Figure 7:
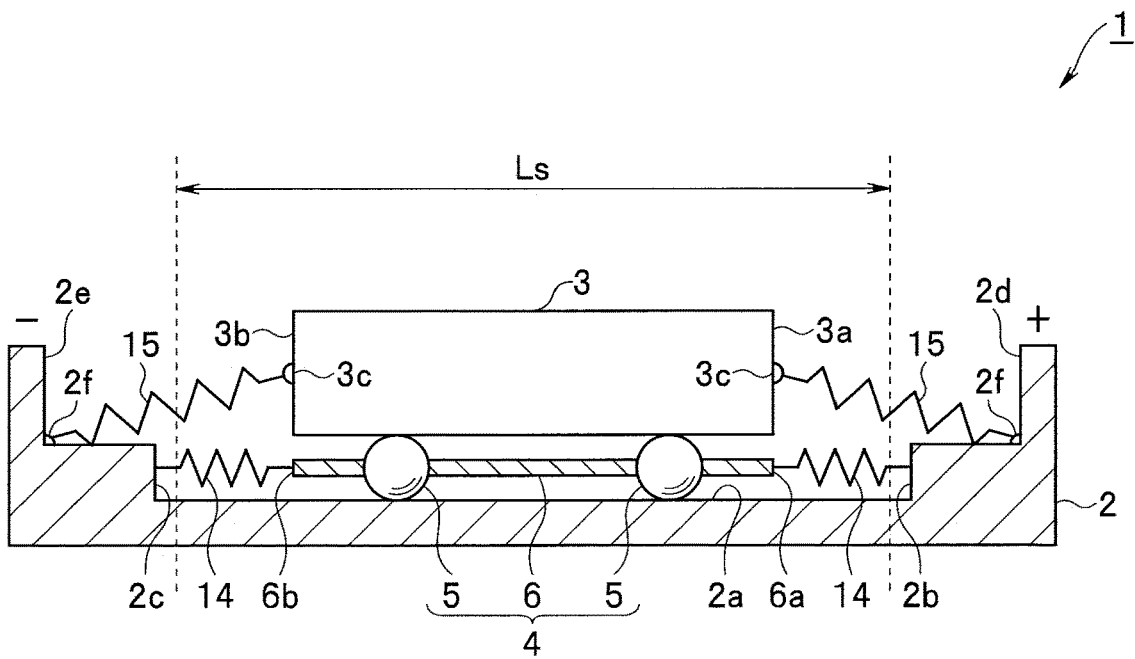
FIG. 7 is a schematic side view of a slide actuator according to a fourth embodiment.
Figure 8A:
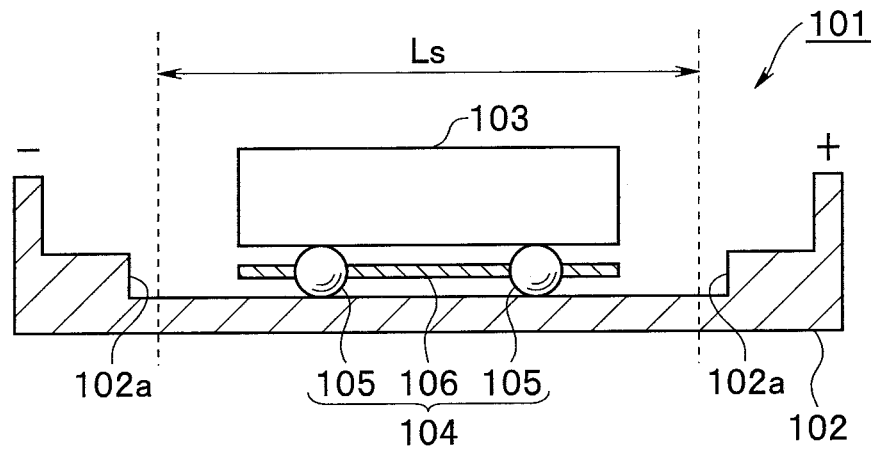
FIG. 8A is a schematic side view of a slide actuator showing a conventional example and a state where a movable portion is at an initial position.
Figure 8B:
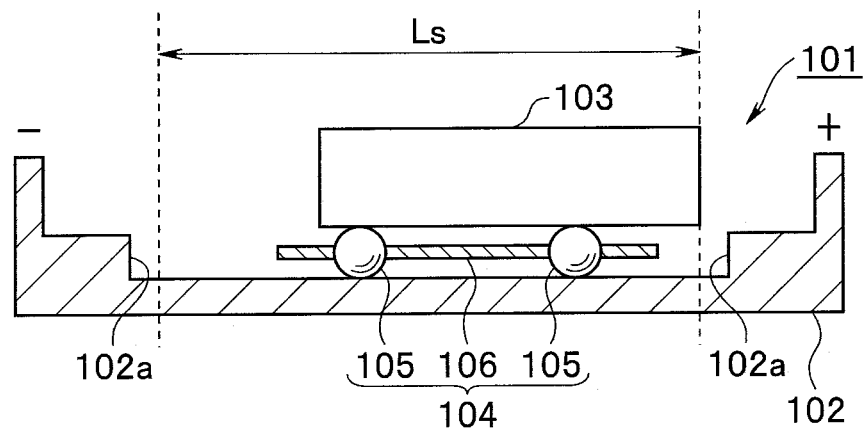
FIG. 8B is a schematic side view of the slide actuator according to the conventional example showing a state where the movable portion reaches a movable end of a forward path.
Figure 8C:
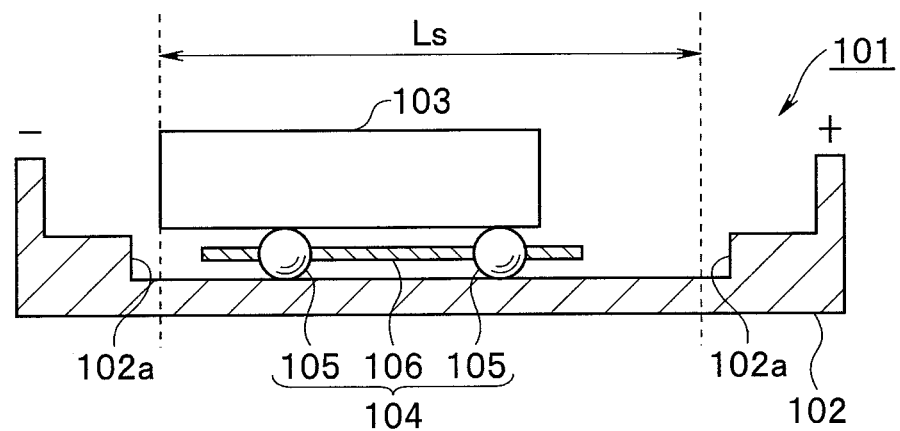
FIG. 8C is a schematic side view of the slide actuator according to the conventional example showing a state where the movable portion reaches a movable end of a backward path.
Figure 9A:
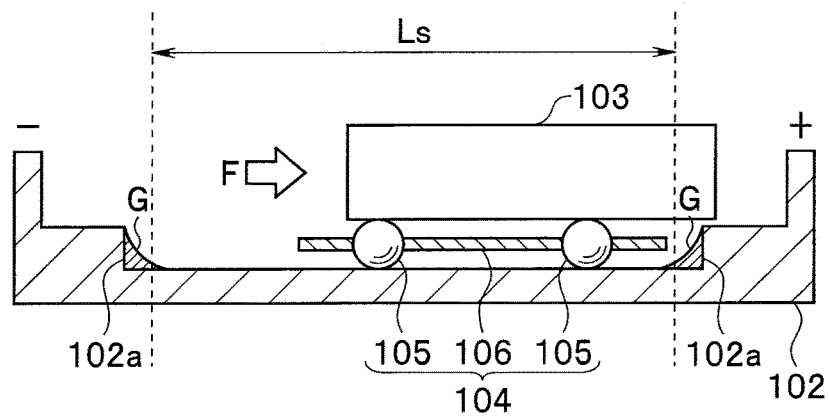
FIG. 9A is a schematic side view of the slide actuator according to the conventional example showing a state where the movable portion is biased in a forward path direction by a biasing force generated by disturbance.
Figure 9B:
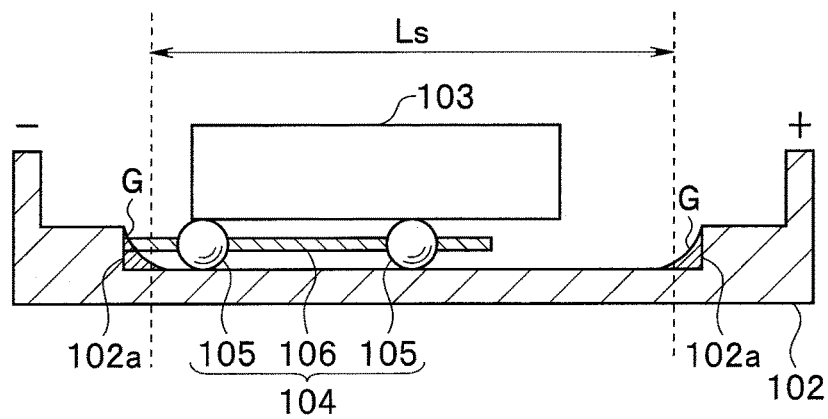
FIG. 9B is a schematic side view of the slide actuator according to the conventional example showing a state where a retainer is brought into contact with a wall portion on the backward path side.
Figure 9C:
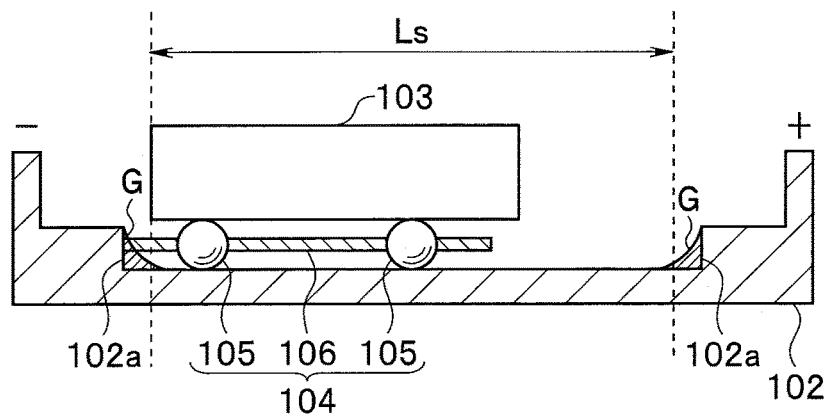
FIG. 9C is a schematic side view of the slide actuator according to the conventional example showing a state where the movable portion is made to slide to the movable end.
Figure 9D:
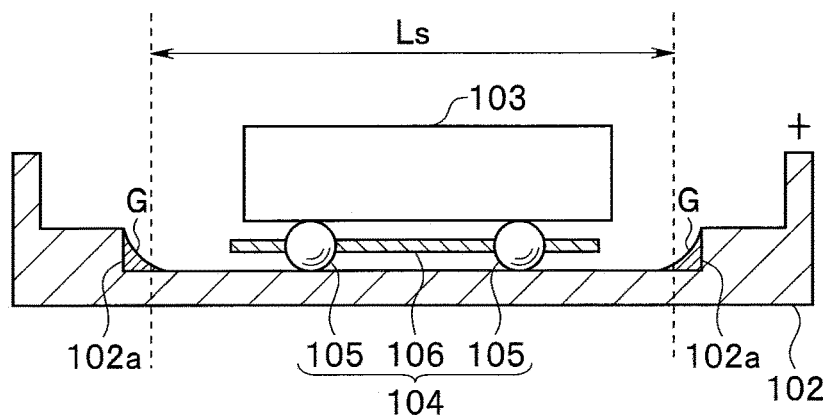
FIG. 9D is a schematic side view of the slide actuator according to the conventional example showing a state where the movable portion passes the initial position.

FIG. 7 shows a fourth embodiment of the present invention. The present embodiment is a modification of the above-mentioned first embodiment. Components similar to the corresponding components in the first embodiment are given the same symbols and the description of such components is omitted or simplified.

In the embodiment, one ends of movable portion springs 15 are vertically swingably connected to end portions 3a, 3b of a movable portion 3 by way of link members 3c. The other ends of the movable portion springs 15 are vertically swingably connected to lower portions of upper wall portions 2d, 2e by way of link members 2f.

The movable portion springs 15 are tensile springs, and constantly bias the movable portion 3 in an oblique downward direction, that is, in a direction along which the movable portion springs 15 push a bottom surface of the movable portion 3 toward balls 5. Operations of the movable portion 3 and a linear guide 4 when the movable portion 3 performs reciprocating linear movement and operations of the movable portion 3 and a retainer 6 when at least one of the movable portion 3 and the retainer 6 is pushed by a strong biasing force F are similar to the corresponding operations in the first embodiment and hence, the description of these operations is omitted.

During a period in which the movable portion 3 performs reciprocating linear movement, the bottom surface of the movable portion 3 is constantly pushed to the balls 5 by a downward biasing force of the movable portion springs 15. Accordingly, slippage minimally occurs between the movable portion 3 and the balls 5 and hence, the movable portion 3 and the linear guide 4 can be made to perform reciprocating linear movement in a state where a proper positional relationship is held. As a result, a sliding friction minimally occurs during the reciprocating linear movement and hence, wear resistance and durability can be enhanced. Further, by imparting a function of pushing the movable portion 3 toward a ball 5 side to the movable portion springs 15, the structure is simplified and hence, downsizing and the reduction of weight can be realized.

What is claimed is:

1. A slide actuator comprising:
    a fixed member;
    a movable member movable in a predetermined direction with respect to the fixed member;
    a wall portion of the fixed member disposed in a moving direction of the movable member;
    a plurality of balls interposed between the fixed member and the movable member and configured to movably support the movable member;
    a retainer interposed between each of the plurality of balls and configured to maintain a constant distance between each of the plurality of balls;
    a first structural body having spring property and connected between the wall portion and the retainer; and
    a second structural body having spring property and connected between the wall portion and the movable member, wherein
    the first structural body is disposed so as to suppress a displacement of the retainer in the moving direction, and
    the second structural body is disposed so as to suppress a displacement of the movable member in the moving direction.

2. The slide actuator according to claim 1, wherein
    the first structural body is disposed on both sides of the retainer, and
    the second structural body is disposed on both sides of the movable member.

3. The slide actuator according to claim 2, wherein a spring constant of the first structural body is set to ½ of a spring constant of the second structural body.

4. The slide actuator according to claim 1, wherein
    the first structural body is disposed on one side of the retainer, and
    the second structural body is disposed on a same side as the first structural body.

5. The slide actuator according to claim 4, wherein a spring constant of the first structural body is set to ½ of a spring constant of the second structural body.

6. The slide actuator according to claim 3, wherein both the first structural body and the second structural body are tensile springs.

7. The slide actuator according to claim 3, wherein both the first structural body and the second structural body are compression springs.

8. The slide actuator according to claim 3, wherein both the first structural body and the second structural body are magnetic springs.

9. The slide actuator according to claim 5, wherein both the first structural body and the second structural body are tensile and compression dual-use springs.

10. The slide actuator according to claim 6, wherein one ends of the tensile springs are connected to the movable member and another ends of the tensile springs are connected to the wall portion in a state where the tensile springs bias the movable member in a direction along which the tensile springs push the movable member toward the balls.

11. A voice coil motor provided with the slide actuator according to claim 1.

* * * * *